Aug. 2, 1960     H. LEHMANN     2,947,375
ADJUSTABLE MUDGUARD

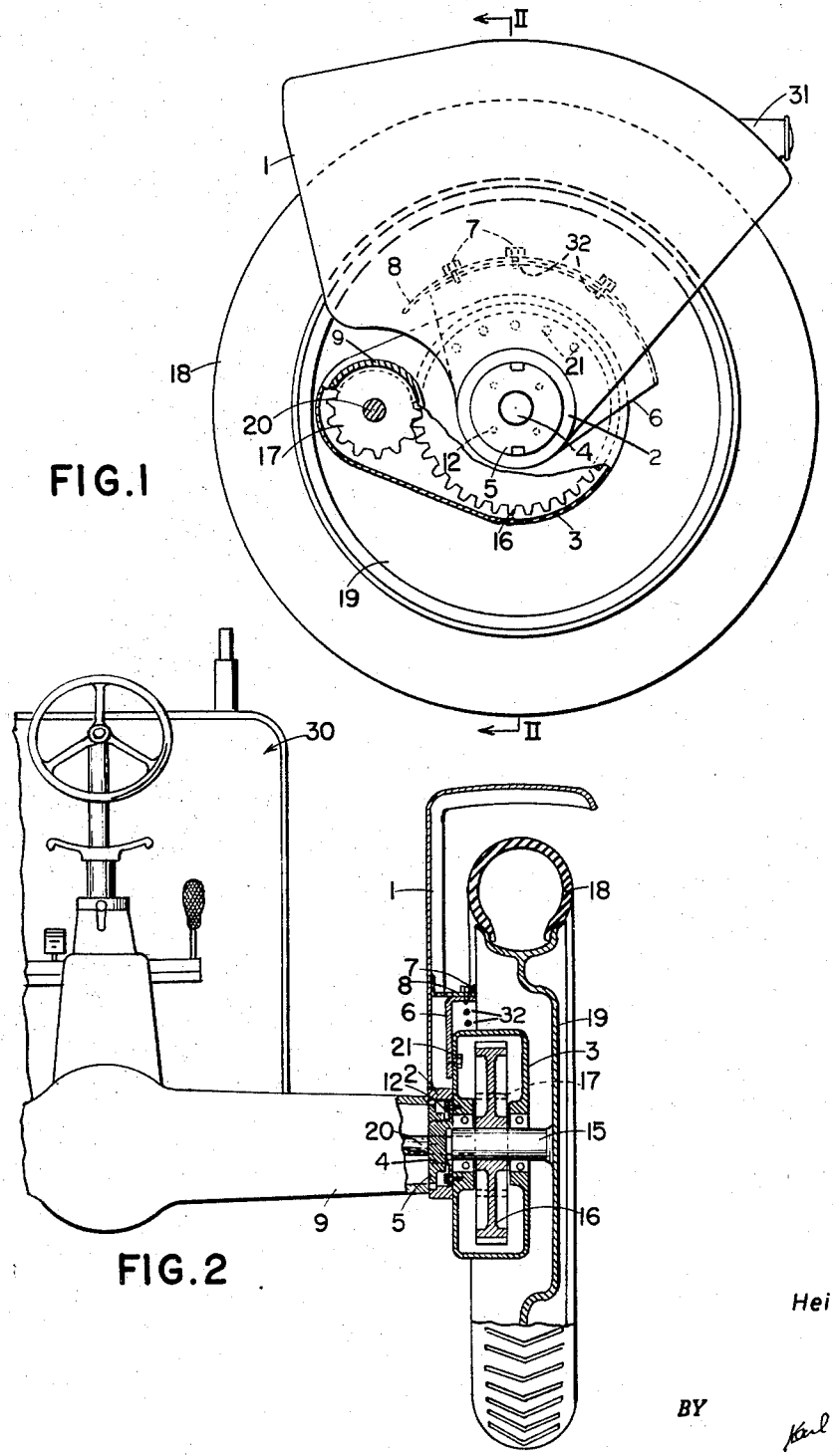

Filed May 11, 1959     2 Sheets-Sheet 2

Heinz Lehmann
INVENTOR.

BY

AGENT.

United States Patent Office 2,947,375
Patented Aug. 2, 1960

2,947,375
ADJUSTABLE MUDGUARD

Heinz Lehmann, Schonebeck (Elbe), Germany, assignor to VEB Traktorenwerk Schonebeck, Schonebeck (Elbe), Germany, a corporation of Germany Filed May 11, 1959, Ser. No. 812,457

Claims priority, application Germany May 13, 1958

6 Claims. (Cl. 180—75)

My present invention relates to an adjustable mudguard for use with pinion-driven tractors and similar prime movers.

Agricultural tractors and other land-working machines are often fitted with a pinion drive gear which permits the rear driven wheels to be adjusted in a manner allowing varying degrees of ground clearance for the undercarriage. Previously such vehicles had mounted fenders or mudguard whose removal and remounting were made necessary whenever undercarriage clearance was to be altered. If adjustments of the mudguard were not made to accommodate the new position of the pinion-gear housing, the tractor driver and the forward part of the tractor were exposed to spray and mud from the rear wheels. Correct repositioning of the mudguard was a time-consuming and laborious effort which, because of the need to remove the mudguard, often resulted in the necessity of reconnecting rear lamps and other electrical apparatus commonly attached to the mudguard. In the remounting process such apparatus was frequently damaged.

It is, accordingly, an object of my invention to provide a conveniently adjustable mudguard for pinion-driven prime movers.

In accordance with my present invention I rotatably mount the mudguard on the pinion-gear housing associated with a driven tractor wheel and provide, in addition to a central fastening device such as a nut bearing upon the hub of the mudguard, an adjustable eccentric locator for maintaining the mudguard in a selected angular position relative to the housing. In a specific embodiment, the locator has the form of a parallalogrammatic linkage positively retaining the mudguard in an absolute position independent of any inclination of the housing relative to the horizontal, the linkage for this purpose advantageously including a member fixed to the axle housing with which the gear housing is displaceably connected.

These and other objects, features and advantages will become more fully apparent from the following description, reference being made to the accompanying drawing in which:

Fig. 1 is a side-elevational view of a mudguard according to my invention;

Fig. 2 is an elevational view of a tractor provided with such mudguard, the latter being shown in a cross-sectional view taken on line II—II of Fig. 1;

Figure 3:
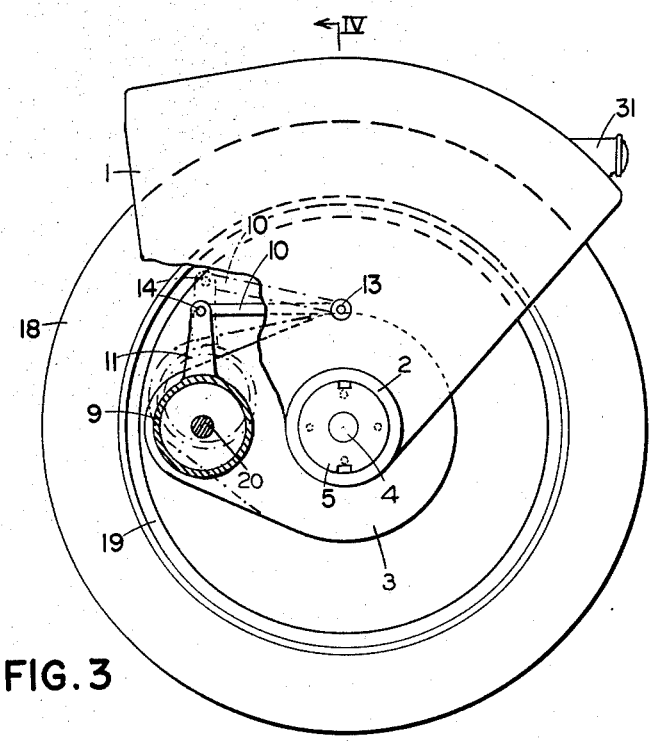
Fig. 3 is a side-elevational view of a modified mudguard according to my invention.

Figs. 1 and 2 show a tractor 30 with a mudguard 1 which carries a rear lamp 31 and has a reinforced hub 2 resting against a pinion-gear housing 3; an adapter 4 with a threaded neck is bolted at 12 to the pinion-gear housing. A positioning lock nut 5 releasably clamps the hub 2 between itself and the housing 3. A sectoral supporting bracket 6, rigidly secured to pinion-gear housing 3 by screws 21, is bolted at 7 to an arcuate flange 8 which is attached to the mudguard 1. An axle housing 9 of tractor 30 surrounds an axle 20 which drives a pinion gear 17 and, through it, a driven gear 16 on the axle 15 of a wheel 19 with tire 18.

Mudguard 1 (Figs. 1 and 2) is adjustable as follows: Wheel 19, axle 15 and gear housing 3 are rotated about axle housing 9 in such a manner as to increase or lessen the undercarriage clearance, displacing mudguard 1 forwardly or rearwardly as the undercarriage is raised or lowered. For example, if the housing 3 is rotated in clockwise direction as viewed in Fig. 1, the undercarriage will be raised and the mudguard displaced rearwardly. To restore the mudguard 1 to its proper functioning position, lock nut 5 is loosened and the bolts 7 removed. The mudguard 1 is rotated to its proper location, the bolts 7 are reinserted into the holes 32 provided for this purpose in bracket 6 and flange 8, and lock nut 5 is screwed tightly to lock the mudguard in place.

Figure 4:
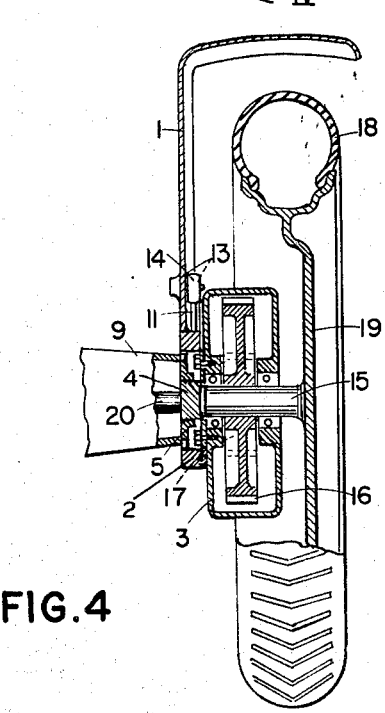
Fig. 4 is a view similar to Fig. 1, with the modified mudguard shown in a cross-sectional view taken on line IV—IV of Fig. 3.

The assembly shown in Figs. 3 and 4 differs from that of Figs. 1 and 2 by the omission of bracket 6 and flange 8; instead the mudguard 1 is provided with a connecting arm 10 which is articulated at one end by a joint 13 to the mudguard and at its other extremity through a joint 14 to a vertical arm 11 rigidly extending from axle housing 9.

With the embodiment of Figs. 3 and 4, any adjustment of gear housing 3 after the loosening of lock nut 5 maintains the mudguard 1 automatically in its normal position as the undercarriage is raised or lowered, owing to the parallelogrammatic linkage represented by the members 1, 3, 10 and 11.

I claim:

1. In a prime mover having a pinion-driven wheel, in combination, an axle housing, a pinion-gear housing swingable about said axle housing and provided with a screw-threaded neck, a driven gear within said pinion-gear housing, said driven gear being provided with an axle for said wheel projecting from said pinion-gear housing, a mudguard for said wheel mounted on said pinion-gear housing with freedom of angular adjustment about said axle, locator means on one of said housings eccentrically engaging said mudguard, and a lock nut threadedly engaging said neck, said lock nut releasably clamping said mudguard between itself and said pinion-gear housing.

2. The combination according to claim 1 wherein said locator means comprises a first member rigid with said pinion-gear housing, a second member rigid with said mudguard, and fastening means adjustably interconnecting said members.

3. The combination according to claim 2 wherein said first member is a sectoral bracket and said second member is an arcuate flange, said bracket and said flange being provided with a plurality of apertures registering with one another in different relative angular positions of said bracket and said flange, said fastening means comprising bolt means traversing said apertures.

4. In a prime mover having a pinion-driven wheel, in combination, an axle housing, a pinion-gear housing swingable about said axle housing, a driven gear within said pinion-gear housing, said driven gear being provided with an axle for said wheel projecting from said pinion-gear housing, a mudguard for said wheel mounted on said pinion-gear housing with freedom of angular adjustment about said axle, and locator means on one of said housings eccentrically engaging said mudguard, said locator means comprising a first member rigid with said axle housing and a second member articulated onto both said mudguard and said first member.

5. The combination according to claim 4 wherein said members, said mudguard and said pinion-gear housing together constitute a parallelogrammatic linkage.

6. The combination according to claim 4 wherein said pinion-gear housing is provided with a screw-threaded neck, further comprising a lock nut threadedly engaging said neck and releasably clamping said mudguard between itself and said pinion-gear housing.

References Cited in the file of this patent

UNITED STATES PATENTS

| | | |
|---|---|---|
| 1,810,635 | White | June 16, 1931 |
| 2,524,205 | Orelind | Oct. 3, 1950 |
| 2,774,604 | Rendels et al. | Dec. 18, 1956 |
| 2,774,610 | Ratcliffe | Dec. 18, 1956 |
| 2,796,140 | Knolle | June 18, 1957 |